United States Patent [19]

Matsunaga et al.

[11] Patent Number: 4,862,840
[45] Date of Patent: Sep. 5, 1989

[54] INTAKE DEVICE FOR INTERNAL COMBUSTION ENGINE

[75] Inventors: Toshihide Matsunaga; Ryuichi Noseyama, both of Saitama, Japan

[73] Assignee: Honda Giken Kogyo Kabushiki Kaisha, Tokyo, Japan

[21] Appl. No.: 165,724

[22] Filed: Mar. 9, 1988

[30] Foreign Application Priority Data

Mar. 9, 1987 [JP] Japan .................................. 62-53510
Mar. 9, 1987 [JP] Japan .................................. 62-53511

[51] Int. Cl.⁴ ............................................ F02B 75/18
[52] U.S. Cl. ............................. 123/52 M; 123/52 MC
[58] Field of Search .......... 123/52 M, 52 MB, 52 MC, 123/188 M, 308, 432

[56] References Cited

U.S. PATENT DOCUMENTS

| 4,232,640 | 11/1980 | Matsumoto et al. | 123/308 |
| 4,627,396 | 12/1986 | Yoshida | 123/308 |
| 4,643,136 | 2/1987 | Ura et al. | 123/432 |
| 4,714,063 | 12/1987 | Oda et al. | 123/308 |
| 4,725,177 | 4/1988 | Koike | 123/52 MC |

FOREIGN PATENT DOCUMENTS

| 57-110765 | 7/1982 | Japan . | |
| 0185954 | 10/1983 | Japan | 123/52 MB |
| 0116022 | 6/1986 | Japan | 123/52 M |
| 0035021 | 2/1987 | Japan | 123/52 M |
| 2160264 | 12/1985 | United Kingdom | 123/52 M |

Primary Examiner—David A. Okonsky
Attorney, Agent, or Firm—Lyon & Lyon

[57] ABSTRACT

An internal combustion engine intake device having a high-speed intake passage for high-speed operation and a low-speed intake passage for a low-speed operation of the engine. Each high- and low-speed intake passage is connected to an intake port and valve hole of each cylinder of the engine. An intake box is connected to the upstream ends of the high- and low-speed intake passages and has in inlet coupled to a throttle body having a throttle valve operable in response to throttle operation by the driver. Control valves are disposed in each high- and low-speed intake passage for individually controlling the flow passage areas and the valves are operated to provide the optimum intake air flow.

19 Claims, 5 Drawing Sheets

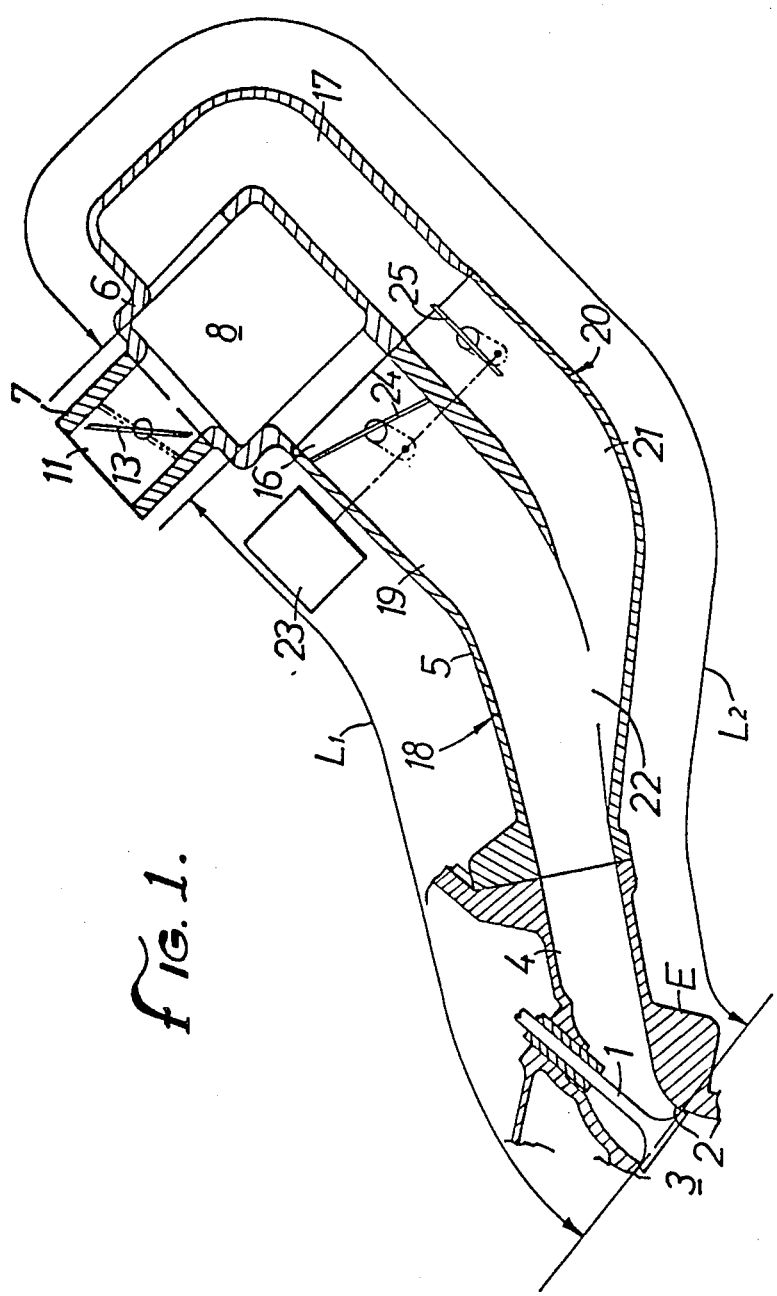

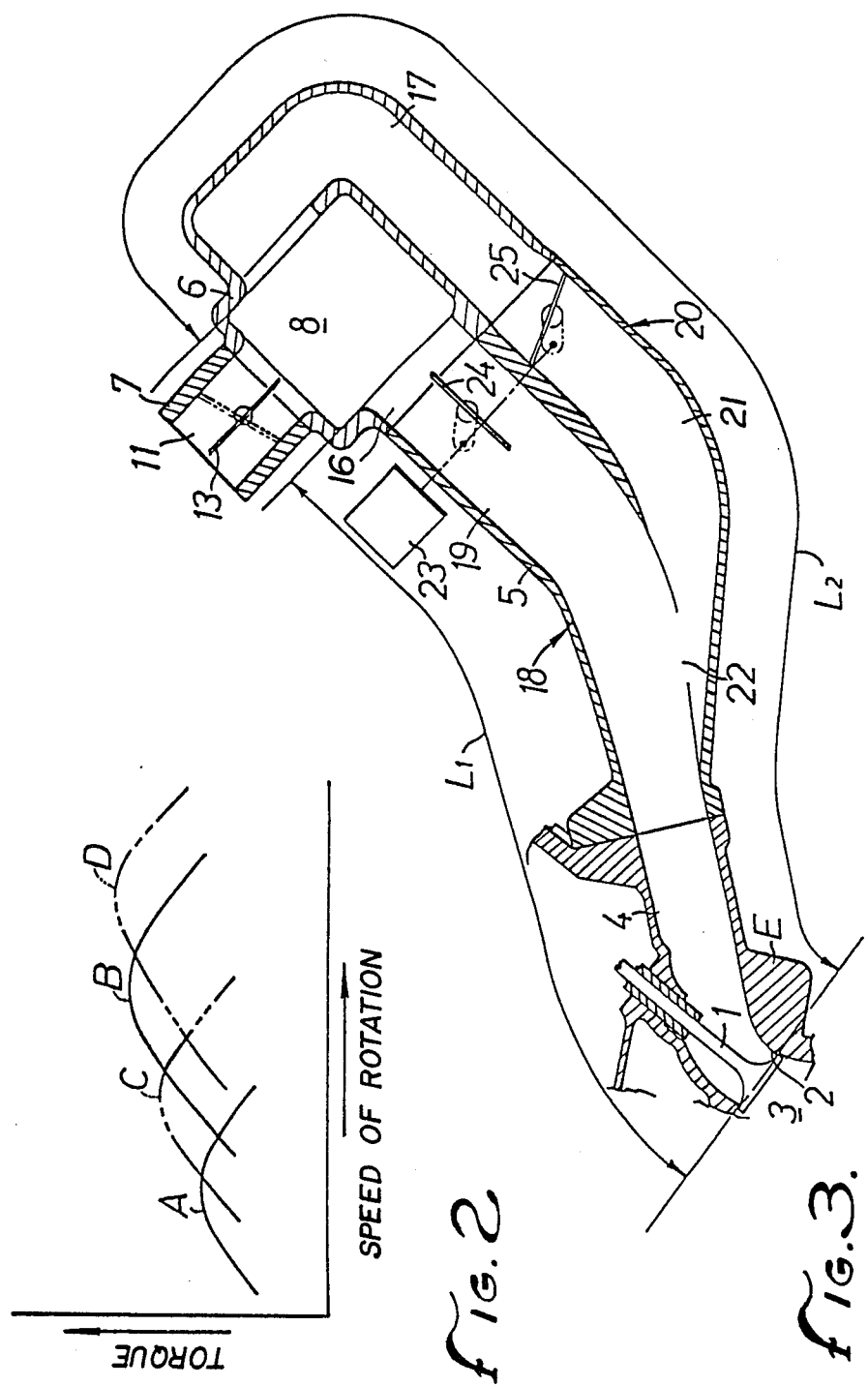

INTAKE DEVICE FOR INTERNAL COMBUSTION ENGINE

The present invention relates to an intake device for an internal combustion engine and, in particular to an intake device having a high-speed intake passage for a high-speed operation range of the engine, a low-speed intake passage for a low-speed operation range of the engine.

Heretofore, an intake device of this general type has been known from Japanese Laid-Open Patent Publication No. 57-110765, for example. Such an arrangement can produce a high power output in a high-speed operation range and a high torque in a low-speed operation range, but causes an abrupt change in output characteristics between the high- and low-speed operation ranges.

Further, the above Japanese Patent Publication discloses an arrangement in which low- and high-speed intake passages are individually connected to mutually independent intake chambers, and an arrangement in which a low-speed passage and a high-speed intake passage having an on/off valve are connected to a common intake chamber. According to the arrangement in which low- and high-speed intake passages are individually connected to mutually independent intake chambers, the engine can produce a high power output in a high-speed operation range and a high torque in a low-speed operation range. During idling, however, since both of the intake chambers communicate with an intake valve hole, the volume communicating with the intake valve hole is large, so that the idling may become unstable and the engine response may be lowered when quick acceleration is sought from the idling condition. In the arrangement in which a low-speed passage and a high-speed intake passage having an on/off valve are connected to a common intake chamber, since the volume of the intake chamber is large, idling may become unstable and the engine response may be lowered during idling with the on/off valve closed.

In view of the above drawbacks in the prior systems, it is an object of the present invention to provide an intake device for an internal combustion engine capable of keeping stable idling and a good response from the idling condition, and of producing smooth output characteristics from low- to high-speed operation ranges.

According to the present invention, control valves coupled to actuators are disposed respectively in high- and low-speed intake passages for individually controlling flow passage areas thereof.

The present invention is applicable to both an arrangement in which one common intake box is connected to the high- and low-speed intake passages and an arrangement in which two intake boxes are connected respectively to the high- and low-speed intake passages.

During operation of the above structure, the openings of the control valves are adjusted dependent on the engine operation range to vary the rate of flow through the high- and low-speed intake passages for smooth output characteristics. With two intake boxes, during idling only the low-speed intake chamber is in communication with the intake valve to stabilize idling.

The invention will be described in connection with two embodiments shown in the accompanying drawings, wherein:

FIG. 1 is a vertical sectional side view of an intake device according to the first embodiment of the invention with the mechanism positioned for low-speed operation;

FIG. 2 is a graph showing the output characteristic of an engine employing the intake device of this invention;

FIG. 3 is a view similar to FIG. 1 showing the mechanism positioned for high-speed operation;

Figure 4:
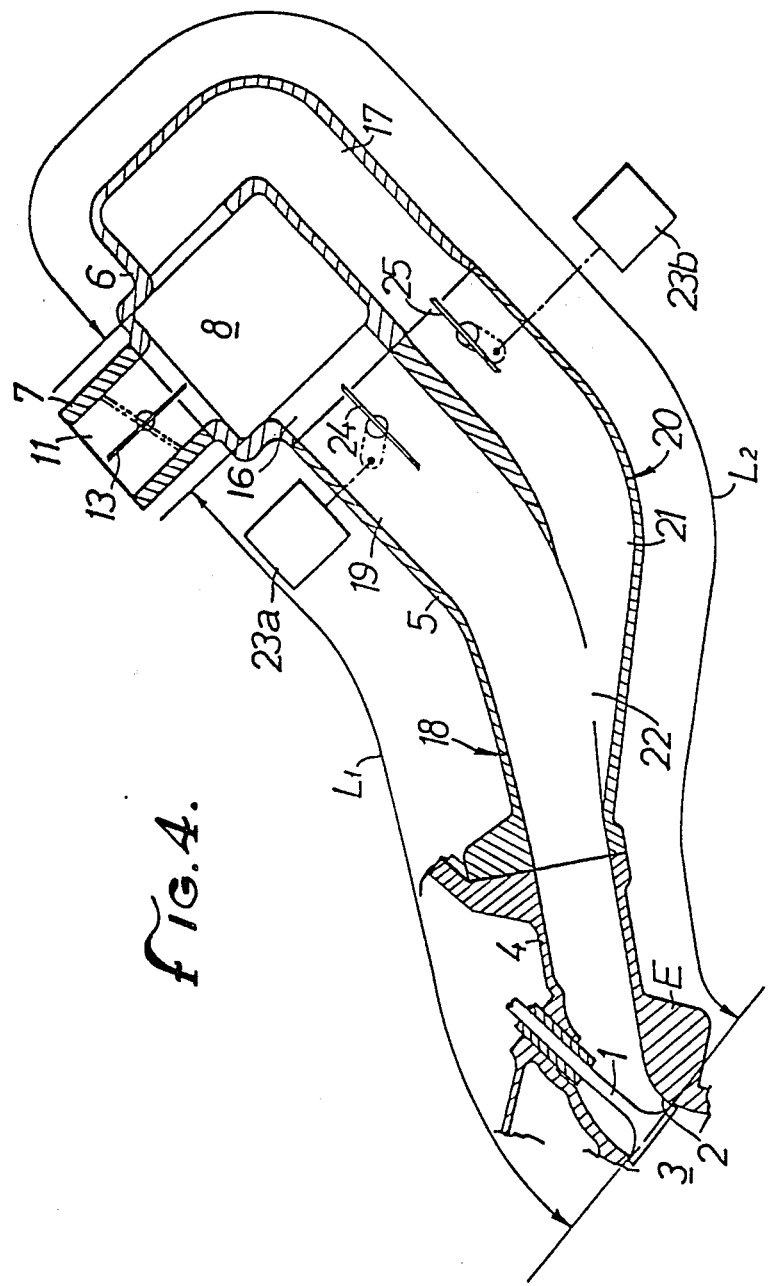
FIG. 4 is a view similar to FIG. 1 showing a modified form of the first embodiment and with the mechanism positioned for ultra high-speed operation.

Referring now in detail to the drawings, as shown in FIG. 1, an engine body E of a multicylinder internal combustion engine has a plurality of intake ports 4 defined in side walls thereof and each intake port 4 is connected to a combustion chamber 3 through an intake valve 1. The intake port 4 is connected through an intake manifold 5 to an intake box 6 coupled to an air cleaner (not shown) via a throttle body 7.

The intake box 6 has a common intake chamber 8 shared by the multiple cylinders of the engine body E. The throttle body 7 is connected to the intake box 6 and has a passage 11 leading to the intake chamber 8. In the passage 11, there is disposed a throttle valve 13 operable in response to throttle operation.

The intake box 6 has a plurality of high-speed intake passageways 16 for the respective cylinders of the engine body E. which high-speed intake passageways 16 communicate in common with the intake chamber 8, and a plurality of low-speed intake passageways 17 for the respective cylinders of the engine body E, which low-speed intake passageways 17 communicate in common with the intake chamber 8. The cross-sectional area of each of the high-speed intake passageways 16 is greater than the cross-sectional area of each of the low-speed passageways 17.

The intake manifold 5 ha a plurality of high-speed intake passageways 19 defined between the high-speed intake passageways 17 and the intake ports 4, with the high-speed intake passageways 16 and 19 jointly constituting the complete high-speed intake passages, generally designated 18, and a plurality of low-speed intake passageways 21 branched from the high-speed intake passageways 19 near the intake ports 4 and extending to the low-speed intake passageways 17, with the low-speed intake passageways 17 and 21 jointly constituting the complete low-speed intake passages, generally designated 20. The high-speed intake passages 18 each have a larger cross-sectional area than those of the low-speed intake passages 20. The total length L1 of the combined intake port 4 and high-speed intake passage 18 is selected to be relatively small in order to maximize the charging efficiency in a high-speed operation range according to an intake inertia effect. The total length L2 of the combined intake port 4, a portion of the high-speed intake passage 18 which lies downstream of a joint 22 where the high- and low-speed intake passages 18, 20 are jointed to each other, and the low-speed intake passage 20 is selected to be relatively large in order to maximize the charging efficiency in a low-speed operation range according to an intake inertia effect.

A control valve 24 is disposed in each of the high-speed intake passages 18 upstream of the joint 22, i.e., in each of the high-speed intake passageways 19 in the intake manifold 5, and the control valve 24 is selectively openable and closable by an actuator 23. Similarly, a control valve 25 is disposed in each of the low-speed intake passages 20, i.e., in each of the low-speed intake passageways 21 in the intake manifold 5, and the control valve 25 is operatively coupled to the actuator 23 for coaction with the control valve 24. The control valves 24, 25 are connected to the actuator 23 such that the control valves 24, 25 can be opened and closed complementarily in varying steps in response to operation of the actuator 23. More specifically, the actuator 23 is actuated in response to throttle operation. The opening of the control valve 24 in the high-speed intake passage 18 varies stepwise from a fully closed position in the low-speed operation range to a fully open position in the high-speed operation range. The opening o the control valve 25 in the low-speed intake passage 20 varies stepwise from a fully open position in the low-speed operation range to a fully closed position in the high-speed operation range.

Operation of the intake device of FIGS. 1-3 now will be described. In the low-speed range of the engine, the opening of the throttle valve 13 is small, the control valve 24 in the high-speed intake passage 13 is fully closed, and the control valve 25 in the low-speed intake valve 20 is fully open, as shown in FIG. 1. Therefore, air which has flowed via the passage 11 into the intake chamber 8 is supplied into the combustion chamber 3 via the low-speed intake passage 20 and the intake port 4. Since the length L2 from the outlet of the intake chamber 8 through the low-speed intake passage 20 to the intake valve hole 2 is selected to provide a maximum charging efficiency in the low-speed operation range, the engine produces a high torque as indicated by the curve A in FIG. 2.

In the high-speed operation range of the engine, the control valve 24 in the high-speed intake passage 18 is open, and the control valve 25 in the low-speed intake passage 20 is closed, as shown in FIG. 3. Therefore, air from the intake chamber 8 is supplied to the intake port 4 through the high-speed intake passage 18. Inasmuch as the length L1 from the intake chamber 8 through the high-speed intake passage 18 and the intake port 4 to the intake valve hole 2 is selected to provide a maximum charging efficiency in the high-speed operation range, the engine produces a high power output as indicated by the curve B in FIG. 2.

The intake inertia effect is positively utilized in the low- and high-speed operation ranges as described above. In a transition between the low- and high-speed operation ranges, the openings of the control valves 24, 25 are varied stepwise to provide output characteristics as indicated by the curve C in FIG. 2. Thus, smooth output characteristics can be attained in the transition from the low-speed operation range to the high-speed operation range.

FIG. 4 shows an intake device according to a modified form of the first embodiment of the present invention. In this modified embodiment, the control valves 24, 25 are coupled respectively to separate actuators 23a, 23b. In an ultrahigh-speed operation range, both of the control valves 24, 25 can be opened, as shown in FIG. 4, to supply air also from the low-speed intake passage 20. Accordingly, the output power is prevented from dropping in the ultrahigh-speed range, as indicated by the right-hand portion of curve C, but rather the output power increases as shown by curve D in FIG. 2.

According to still another modification of this first embodiment of the present invention, the throttle body 7 may have a pair of passages having respective throttle valves therein.

With this first embodiment of the present invention, as described above, control valves coupled to actuators are disposed respectively in high- and low-speed intake passages for individually controlling flow passage areas thereof. Therefore, the engine can produce a high torque in a low-speed operation range and a high power output in a high-speed operation range. By adjusting the openings of the control valves, the engine output characteristics can be controlled precisely for attaining smooth output characteristics in the transition between low-speed and high-speed operation.

Figure 5:
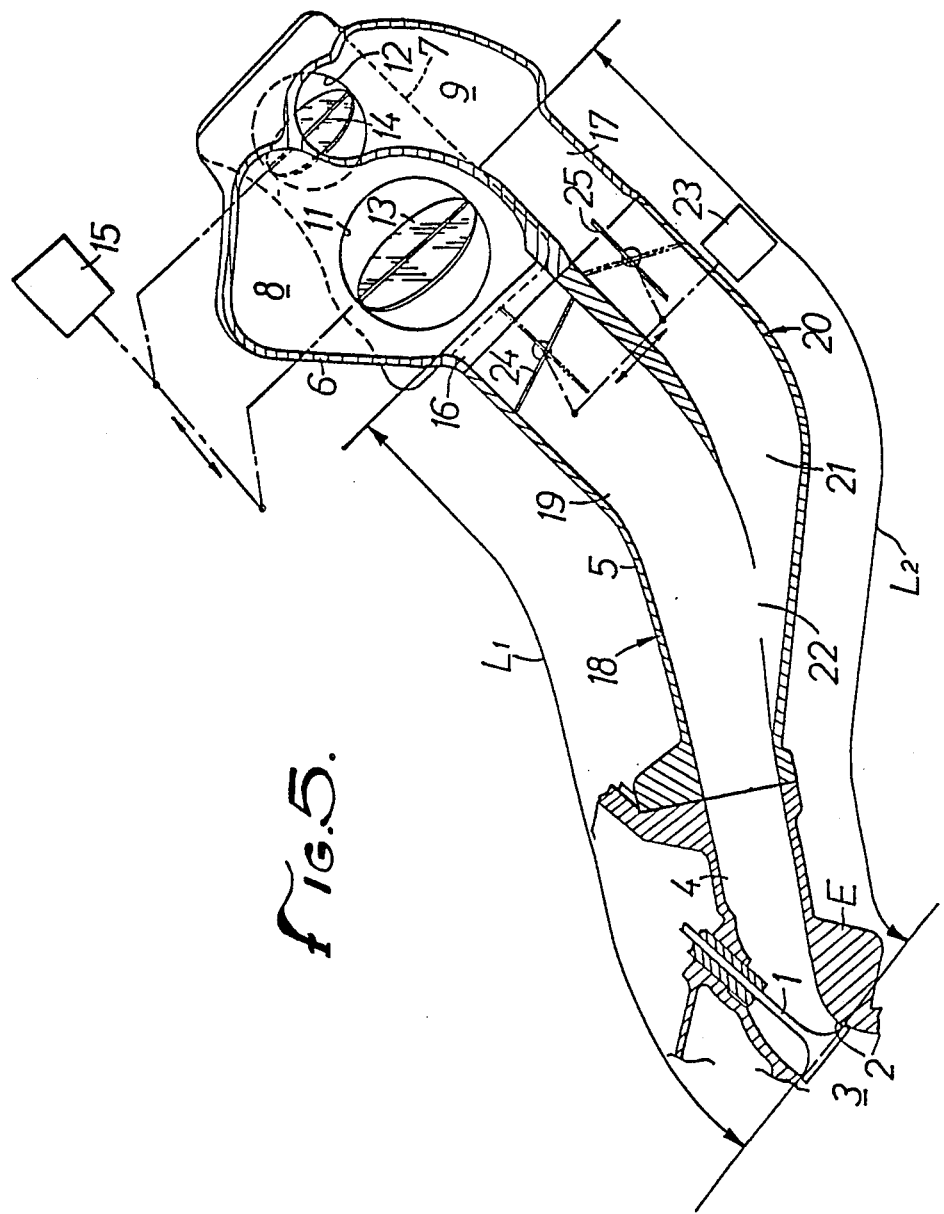
FIG. 5 is a vertical sectional side view of a second embodiment of the invention.

Referring now to FIG. 5, the second embodiment of the present invention is shown and will be described. Again, as with the first embodiment, an engine body E of a multicylinder internal combustion engine has a plurality of intake ports 4 defined in side walls thereof and each connected to a combustion chamber 3 through an intake valve hole 2 which is selectively openable and closable by an intake valve 1. The intake port 4 is connected through an intake manifold 5 to an intake box 6 coupled to an air cleaner (not shown) via a throttle body 7.

The intake box 6 is shared by the cylinders of the engine body E. The intake box 6 has defined therein a high-speed intake chamber 8 that is positioned close to the engine body E and a low-speed intake chamber 9 that is positioned remote from the engine body E, with a partition lying between the high- and low-speed intake chamber 8, 9. The high-speed intake chamber 8 has a relatively large volume, whereas the low-speed intake chamber 9 has a relatively small volume. The throttle body 7 is connected to the intake box 6 on one end of the array of cylinders of the engine body E. The throttle body 7 has a high-speed passage 11 that communicates with the inlet of the high-speed intake chamber 8 and a low-speed passage 12 that communicates with the inlet of the low-speed intake chamber 9, the high- and low-speed passages 11, 12 being independent of each other. A first throttle valve 13 is openably and closably disposed in the high-speed passage 11, whereas a second throttle valve 14 is openably and closably disposed in the low-speed passage 12. A common actuator 15 is operatively coupled to the throttle valves 13, 14 for actuating them in response to throttle operation.

The intake box 6 has a plurality of high-speed intake passageways 16 for the respective cylinders of the engine body E, which high-speed intake passageways 16 communicate with the high-speed intake chamber 8, and a plurality of low-speed intake passageways 17 for the respective cylinders of the engine body E, which low-speed intake passageways 17 communicate with the low-speed intake chamber 9. The cross-sectional areas of each of the high-speed intake passageways 16 is greater than the cross-sectional area of each of the low-speed passageways 17.

As with the first embodiment, the intake manifold 5 of this second embodiment as high-speed intake passageways 18 of a length L1 shorter than the low-speed passageways 20 of a length L2. The passageways 18 and 20 are comprised of plural portions as described previously.

A first control valve 24 is disposed in each of the high-speed intake passages 18 upstream of the joint 22, i.e., in each of the high-speed intake passageways 19 in the intake manifold 5, and the first control valve 24 is selectively openable and closable by an actuator 23. Similarly, a second control valve 25 is disposed in each of the low-speed intake passages 20, i.e., in each of the low-speed intake passageways 21 in the intake manifold 5, and the second control valve 25 is operatively coupled to the actuator 23 for coaction with the first control valve 24. The control valves 24, 25 are connected to the actuator 23 such that the control valves 24, 25 can be opened and closed complementarily in varying steps in response to operation of the actuator 23. The actuator 23 is actuated in response to throttle operation. The opening of the first control valve 24 in the high-speed intake passage 18 varies stepwise from a fully closed position in the low-speed operation range to a fully open position in the high-speed operation range. The opening of the second control valve 245 in the low-speed intake passage 20 varies stepwise from a fully open position in the low-speed operation range to a fully closed position in the high-speed operation range.

In the high-speed operation range of the engine with this second embodiment of the intake device of this invention, the first control valve 24 is open and the second control valve 25 is closed. In this condition, air is supplied to the intake port 4 via the high-speed intake passage 18. Since the length L1 traversed by the air flow is selected to provide a maximum charging efficiency in the high-speed operation range, the engine produces a high power output as indicated by the curve B in FIG. 2. In he high-speed operation range of the engine, since the volume of the high-speed intake chamber 8 is relatively large, interference due to intake pulsations between the engine cylinders is avoided to provide a desired intake inertia effect.

In the low-speed operation range of the engine, the first control valve 24 is closed and the second control valve 25 is open. Air is supplied only from the low-speed intake passage 20 to the intake port 4. Since the length L2 traversed by the air flow is selected to provide a maximum charging efficiency in the low-speed operation range, the engine produces a high torque as indicated by the curve A in FIG. 2.

During idling, the portion of the high-speed intake passage 18 which lies upstream of the first control valve 245 is shut off from the intake prot 4, and a portion of the high-speed intake passage 18 which lies downstream of the first control valve 24 the low-speed intake passage 20, and the low-speed intake chamber 9 communicate with the intake port 4. The volume of the low-speed intake chamber 9 is small. Therefore, the volume of the chambers and passages communicating with the intake port 4 is comparatively small so that stable idling is achieved and the response to a change in the rate of intake air flow such as for quick acceleration is increased.

In a transition between the low- and high-speed operation ranges, the openings of the control valves 24, 25 are varied stepwise to provide output characteristics as indicated by the curve C in FIG. 2. Thus, smooth output characteristics can be attained from the low-speed operation range to the high-speed operation range.

Figure 6:
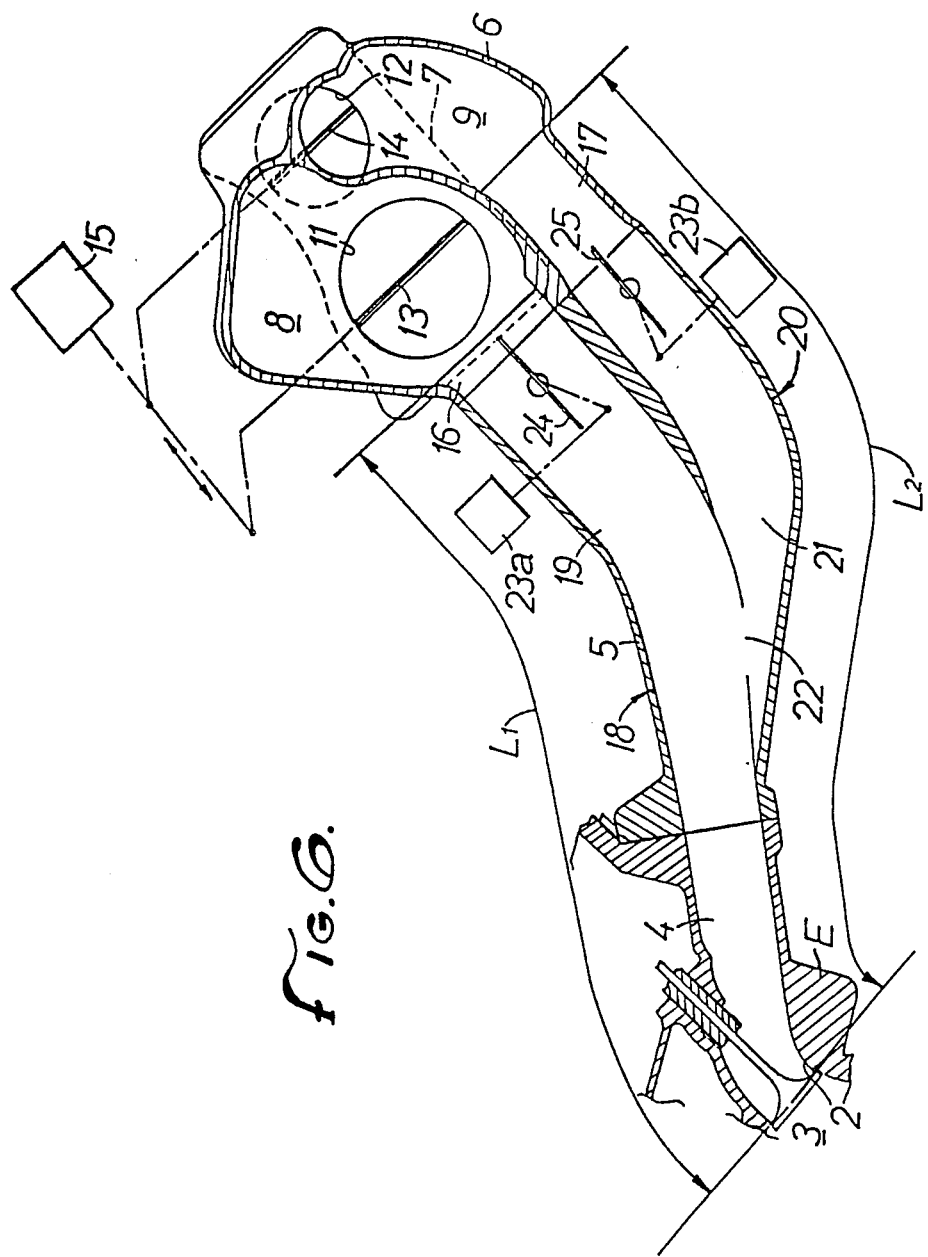
FIG. 6 is a view similar to FIG. 5 showing a modified form of the second embodiment and with the mechanism positioned for ultra high-speed operation.

FIG. 6 shows an intake device according to a modification of this second embodiment of the present invention. In this modified embodiment, the control valves 24, 25 are coupled respectively to separate actuators 23a, 23b. In an ultrahigh-speed operation range, both of the control valves 24, 25 can be opened to supply air not only from the high-speed intake passage 18 but also from the low-speed intake passage 20. Accordingly, the change in the output characteristics between the ultrahigh-and high-speed operation ranges can be smoothed, as indicated by the curve D in FIG. 2.

According to still another modification of this second embodiment of the present invention, the control valves 24, 25 may be controlled independently and the throttle valves 13, 14 may also be controlled independently. For example, in the high-speed operation range, the control valves 24, 25 are opened and the throttle valves 13, 14 are controlled to attain smooth output characteristics.

With this second embodiment of the present invention, as described above, control valves are disposed respectively high-and low-speed intake passages for individually controlling flow passage areas thereof, the upstream end of the high-speed intake passage being connected to a high-speed intake chamber defined in an intake box, and the upstream end of the low-speed intake passage being connected to a low-speed intake chamber defined in the intake box independently of the high-speed intake chamber. Therefore, the engine can produce a high torque in a low-speed operation range and a high power output in a high-speed operation range, and the engine output characteristics can be controlled precisely for attaining smooth output characteristics. Moreover, during idling the volume of the region communicating with the intake valve hole is reduced to achieve stable idling and increase the engine response from the idling condition.

We claim:

1. An intake device for an internal combustion engine, which device has a high-speed intake passage for a high-speed operation range of the engine, a low-speed intake passage for a low-speed operation range of the engine, wherein said low-speed intake passage is longer and has a smaller cross-sectional area than said high-speed intake passage, the high and low-speed intake passages having downstream ends for connecting to an intake valve hole defined in an engine body, and an intake box connected to upstream ends of the high- and low-speed intake passages, the intake box having an inlet coupled to a throttle body having a throttle valve operable in response to throttle operation, a control valve disposed in each said high- and low-speed intake passages for individually controlling flow passage areas thereof, and actuator means for operating said control valves.

2. An intake device according to claim 1, wherein the actuator means is operable for varying the openings of the control valves in a plurality of steps.

3. An intake device according to claim 1 wherein, said actuator means includes separately operable actuators for the control valves of said high- and low-speed intake passages.

4. An intake device according to claim 3, wherein the actuators include means for operating in a plurality of steps for changing the opening of the control valves.

5. An intake device according to claim 1, wherein the upstream end of said high-speed intake passages is connected to a high-speed intake chamber defined in said intake box, and the upstream end of said low-speed intake passage is connected to a low-speed intake chamber defined in said intake box independently of said high-speed intake chamber.

6. An intake device according to claim 5, wherein said actuator means includes separately operable actuators for the control valves of said high- and low-speed intake passages.

7. An intake device according to claim 5, wherein said low-speed intake chamber is smaller than said high-speed intake chamber.

8. An intake device according to claim 5, wherein separate throttle valves are provided in said throttle body for separately controlling the flow to said high- and low-speed intake chambers.

9. An intake device for an internal combustion engine, comprising, a high-speed intake passage for a high-speed operation range of the engine, a low-speed intake passage for a low-speed operation range of the engine, the high- and low-speed intake passages having downstream ends for connecting to an intake valve hole defined in an engine body, an intake box connected to upstream ends of the high- and low-speed intake passages, wherein the upstream end of said high-speed intake passage is connected to a high-speed intake chamber defined in said intake box, and the upstream end of said low-speed intake passage is connected to a low-speed intake chamber defined in said intake box independently of said high-speed intake chamber, the intake box having an inlet coupled to a throttle body having a throttle valve operable in response to throttle operation, and a control valve with actuator means disposed in each of said high- and low-speed intake passages for individually controlling flow passage areas thereof.

10. An intake device according to claim 9, wherein said low-speed intake passage is longer and has a smaller cross-sectional area than said high-speed intake passage.

11. An intake device according to claim 9, wherein the intake box has separate inlets coupled from the throttle body to the high- and low-speed intake chambers, and a throttle valve is provided in each inlet.

12. An intake device according to claim 9, wherein a plurality of high- and low-speed passages are provided and connect to a single intake box.

13. An intake device for an internal combustion engine, which device has a high-speed intake passage for a high-speed operation range of the engine, a low-speed intake passage for a low-speed operation range of the engine, the high and low-speed intake passages having downstream ends for connecting to an intake valve hole defined in an engine body, and an intake box connected to upstream ends of the high- and low-speed intake passages, the intake box having an inlet coupled to a throttle body having a throttle valve operable in response to throttle operation, a control valve disposed in each said high- and low-speed intake passage for individually controlling flow passage areas thereof, actuator means for operating said control valves, wherein the upstream end of said high-speed intake passage is connected to a high-speed intake chamber defined in said intake box, and the upstream end of said low-speed intake passage is connected to a low-speed intake chamber defined in said intake box independently of said high-speed intake chamber.

14. An intake device for an internal combustion engine, which device has a high-speed intake passage for a high-speed operation range of the engine, a low-speed intake passage for a low-speed operation range of the engine, the high and low-speed intake passage having downstream ends for connecting to an intake valve hole defined in an engine body, and an intake box connected to upstream ends of the high and low-speed intake passages, the intake box having an inlet coupled to a throttle body having a throttle valve operable in response to throttle operation, a control valve disposed in each said high and low-speed intake passage for individually controlling low passage area thereof, actuator means for operating said control valves, wherein said low-speed intake passage is longer and has a smaller cross-sectional area than said high-speed intake passage, and wherein the upstream end of said high-speed intake passage is connected to a high-speed intake chamber defined in said intake box, and the upstream end of said low-speed intake passage is connected to a low-speed intake chamber defined in said intake box independently of said high-speed chamber.

15. An intake device according to claims 13 or 14, wherein said actuator means includes separately operable actuators for the control valves of said high- and low-speed intake passages.

16. An intake device according to claims 13 or 14, wherein said low-speed intake chamber is smaller than said high-speed intake chamber.

17. An intake device according to claims 13 or 14, wherein separate throttle valves are provided in said throttle body for separately controlling the flow to said high- and low-speed intake chambers.

18. An intake device for an internal combustion engine, comprising, a high-speed intake passage for a high-speed operation range of the engine, a low-speed intake passage for a low-speed operation range of the engine, the high- and low-speed intake passages having downstream ends for connecting to an intake valve hole defined in an engine body, an intake box connected to upstream ends of the high- and low-speed intake passages, wherein the upstream end of said high-speed intake passage is connected to a high-speed intake chamber defined in said intake box, and the upstream end of said low-speed intake passage is connected to a low-speed intake chamber defined in said intake box independently of said high-speed intake chamber, wherein the intake box has separate inlets coupled from the throttle body to the high- and low-speed intake chambers with a throttle valve provided in each inlet which is operable in response to throttle operation, and a control valve with actuator means disposed in each of said high- and low-speed intake passages for individually controlling flow passage areas thereof.

19. An intake device according to claim 18, wherein said throttle valve provided in each inlet is independently operable in response to throttle operation.

* * * * *